R. H. WHITE.
TRACTOR FRAME.
APPLICATION FILED OCT. 29, 1917.
1,275,343.
Patented Aug. 13, 1918.
2 SHEETS—SHEET 2.
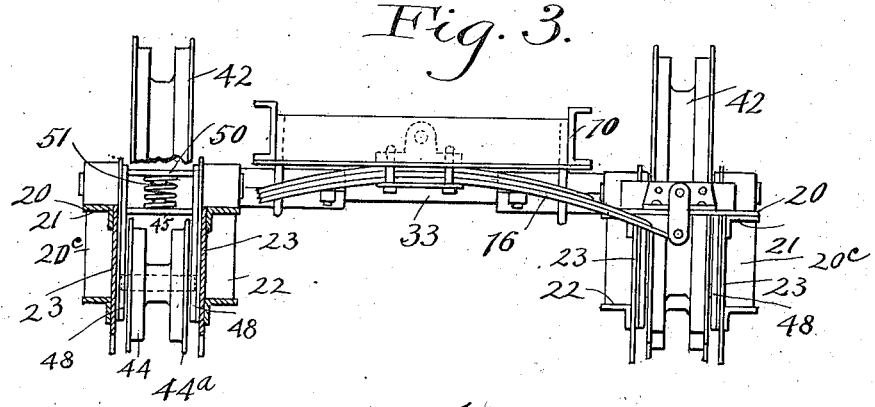
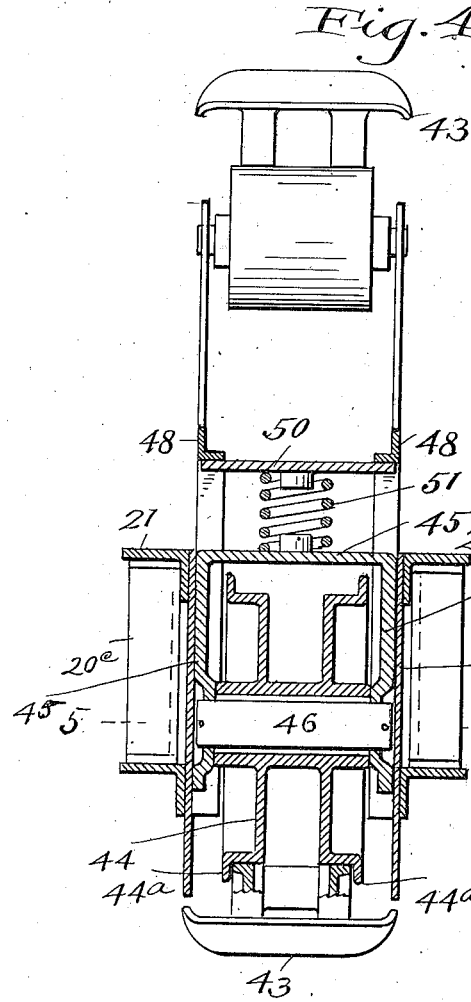
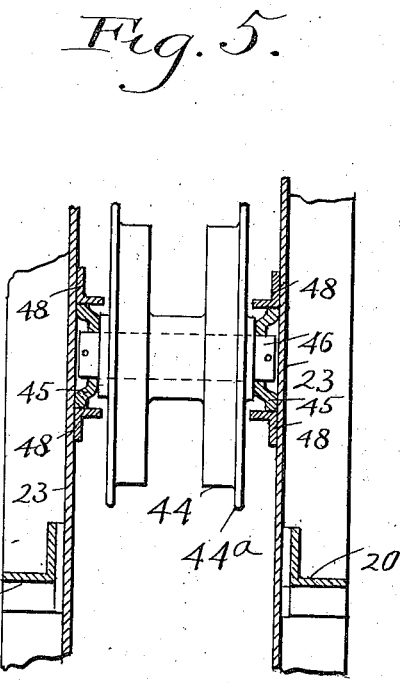
Inventor
Rollin H. White
By Thurston & Kwis
attys.

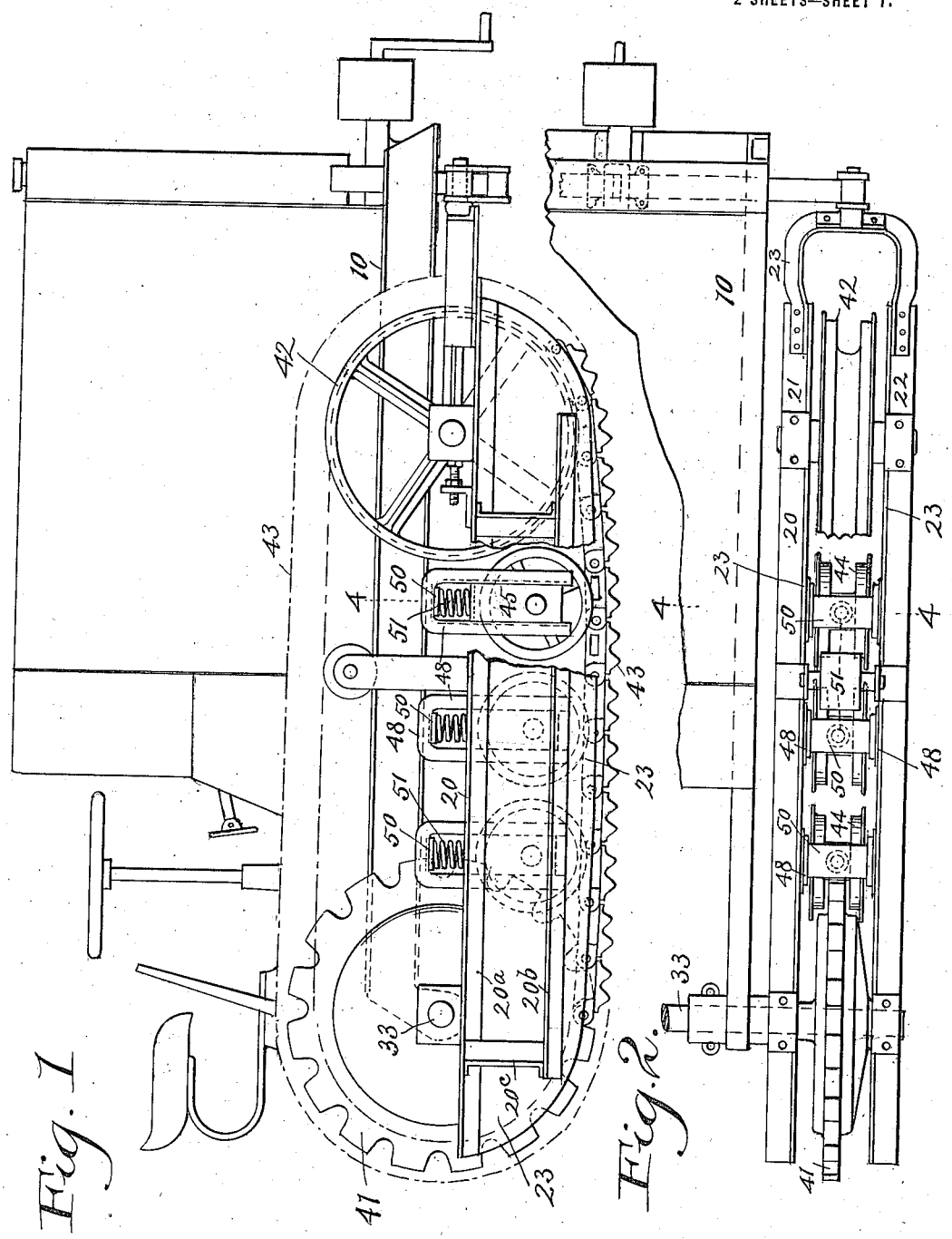

UNITED STATES PATENT OFFICE.

ROLLIN H. WHITE, OF CLEVELAND, OHIO, ASSIGNOR TO THE CLEVELAND TRACTOR COMPANY, OF EUCLID, OHIO, A CORPORATION OF OHIO.

TRACTOR-FRAME.

1,275,343.　　　　Specification of Letters Patent.　　Patented Aug. 13, 1918.

Application filed October 29, 1917.　Serial No. 198,936.

*To all whom it may concern:*

Be it known that I, ROLLIN H. WHITE, a citizen of the United States, residing at Cleveland, in the county of Cuyahoga and State of Ohio, have invented a certain new and useful Improvement in Tractor-Frames, of which the following is a full, clear, and exact description.

This invention relates to the kind of track laying tractors which are typified by the tractor shown and described in Letters Patent No. 1,253,319, granted to me Jan. 15, 1918. In tractors of this sort there is a central platform or main frame which supports the motor and various other parts of the mechanism. On each side of the main frame is a traction frame, which frames are pivoted near their rear ends to the rear part of the main frame on horizontal transversely alined pivots. Generally, these pivots are lateral extensions of a non-rotating rear axle which is fixed to the main frame. Springs are interposed between the front ends of the traction frames, and the main frame; and therefore these traction frames may independently rock upon their pivots without completely transmitting to the main frame the jars and stresses incident to traveling over rough ground. Two driving sprocket wheels are mounted on the rear axle, one associated with each traction frame; and in the front end of each traction frame another track wheel is mounted. An endless flexible track embraces and runs over these two wheels. Suitable mechanism, which may be like that shown in my prior application, is employed to drive the two rear sprocket wheels, and therefore to cause to travel the endless track. A plurality of wheels are commonly mounted upon each traction frame, between the track wheels referred to, and in bearings fixed to the traction frame, and in such position that they engage the lower or ground reach of the endless track.

When a tractor of this known construction is traveling over rough ground, the two traction frames are constantly rocking independently on their pivots, and the front springs are to a large degree relieving the main frame of shocks and jars which it would otherwise feel.

But this construction, while immeasurably better than if the traction frame were rigidly connected with the main frame, is yet imperfect. The main frame is subjected to jars and stresses which are not good for it. Likewise, if the ground over which the tractor is traveling has numerous small projections and holes, a considerable part of the ground reach of the flexible track is frequently out of contact with the ground.

The object of this invention is to greatly improve a tractor of the sort specified with respect to both defects referred to, to the end that the traction frames shall not be required to move independently the main frame as much as with the old construction referred to; and to the end also that a greater part of the ground reach of the flexible track shall be in contact with the uneven surfaces of the ground over which it is traveling.

The invention consists in the construction and combination of parts shown in the drawings and hereinafter described and definitely pointed out in the appended claims.

In the drawings Figure 1 is a side elevation with parts of one of the traction frames broken away; Fig. 2 is a plan view of one of the traction frames and one side of the associated main frame; Fig. 3 is a sectional front elevation of said tractor; Fig. 4 is a sectional front elevation through one of the traction frames in the plane indicated by line 4—4 on Fig. 2; Fig. 5 is a sectional plan view in the plane of line 5—5 on Fig. 4.

Referring to the parts by reference characters, 10 represents the main frame of the tractor. On each side thereof is a longitudinally extended traction frame 20, which near its rear end is ! ing upon lateral extensions of a rear axle 33 which is fixed to the main frame.

Each traction frame is composed of two parallel built up beams 21 and 22, which are connected by a yoke 23 at their front ends. A leaf spring 16 is suitably connected with the main frame near its middle and with two traction frames at its ends. A track wheel 41 is associated with each traction frame, is rotatably mounted in the rear axle, and lies between the two side beams of said traction frame. Preferably this wheel is a sprocket wheel. An associated track wheel 42 is mounted in each traction frame near the front end thereof; and between the two side beams thereof. An endless flexible track 43 is associated with each traction frame and embraces the two track wheels referred to. To the extent specified the construction shown is and may be like that disclosed in my prior application above mentioned.

Each of the two side beams 21, 22, of a traction frame 20 is composed of an upper beam 20ª, a lower beam 20ᵇ, and a suitable number of vertical angle bars 20ᶜ connecting these upper and lower beams. Likewise there is secured to the inner face of each of said beams a metal plate 23 which serves to protect the mechanism lying between the two beams 21, 22. Associated with each traction frame are a plurality of wheels 44 mounted so that they will engage the upper surface of the ground reach of the associated flexible track, said wheels having preferably flanges 44ª at their edges. Associated with each of these wheels is an inverted flat U-shaped frame 45. This lies and is slidable vertically between the two plates 23 of the two beams of the traction frame. A bearing pin 46 extends transversely through the side members of this frame 45 and is supported thereby. A wheel 44 is rotatably supported by this pin between the side members of the frame 45. Associated with each of the frames 45 are four vertical guide bars 48, two of which are fixed to the inner face of the plate 23 of the beam 21, while the other two are fixed to the inner face of the plate 23 of the beam 22. These four bars and the two plates 23 form vertical guideways upon the traction frame in which the inverted U-frame 45 may slide. A spring seat plate 50 is fixed to the upward extensions of these four guide bars 48. Preferably the two guide bars 48 attached to each of the two traction frame members are formed integrally from the same metal bar which is bent so as to be of inverted U-form; in which event the spring seat plate 50 will lie within the upper U-shaped part of the bars and will be secured thereto. A coiled spring 51 is compressed between each plate 50, and the upper end of the associated frame 45. This spring acts to press frame 45 downward and to thereby hold the wheel 44 which is mounted thereon down upon the upper surface of the ground reach of the endless track; but this is a yielding force such as permits each of these wheels to independently move upward relatively to the supporting traction frame. Therefore when the machine is traveling over ground whose surface has many small elevations and depressions each wheel will move up or down to hold the ground reach in contact with the surface to a much greater extent than if said wheels had no independent vertical movement; and likewise this independent vertical movement of these wheels will greatly reduce the independent rocking of the traction frames relatively to the main frame.

Having described my invention, I claim:

1. In a track laying tractor, the combination of a main frame, two traction frames pivotally connected therewith on transverse pivots located near the rear ends of said frames, springs interposed between the front ends of the traction frames and the front end of the main frame, two track wheels mounted in each traction frame, and an endless flexible track associated with each traction frame and embracing the two track wheels, with a plurality of inverted U-shaped members which are mounted in vertical guideways on each traction frame, a spring acting against each of said frames and yieldingly forcing it downward, and a wheel mounted on each of said frames for engagement with the upper surface of the ground reach of the associated track.

2. In a track laying tractor, the combination of a main frame, two traction frames pivotally connected therewith on transverse pivots located near the rear ends of said frames, each of said traction frames comprising two parallel beams which are suitably connected together, two track wheels mounted on each traction frame between the two beams thereof, and an endless flexible track associated with each traction frame and embracing the two track wheels, with a plurality of inverted U-shaped wheel supports each of which is mounted to slide vertically between the two members of the associated traction frame, vertical guide bars fixed to the two members of the traction frame for engagement with said U-shaped frame, a pin which passes through the lower ends of both members of the U-shaped frame, a rotatable track wheel carried by said pin for engagement with the ground reach of the associated track, a spring seat bar fixed to the projecting upper ends of said vertical guide bars, and a coil spring interposed between said spring seat bar and the upper member of said U-shaped frame.

3. In a track laying tractor, a traction frame adapted to be pivotally connected with the main frame of the machine, which traction frame comprises two parallel beams each of which has a metal plate fixed to its inner face, combined with a plurality of inverted U-frames each of which is slidably mounted between said two metal plates, vertical guide bars associated with each U-frame and secured to said plates in position to guide said U-frame, a wheel rotatably mounted in each U-frame, and a spring acting on each U-frame to yieldingly press it downward relatively to said traction frame.

In testimony whereof, I hereunto affix my signature.

ROLLIN H. WHITE.